3 Sheets—Sheet 1.
R. CULBERTSON & A. EDGAR.
GRAIN-BINDER.
No. 177,623.    Patented May 23, 1876.
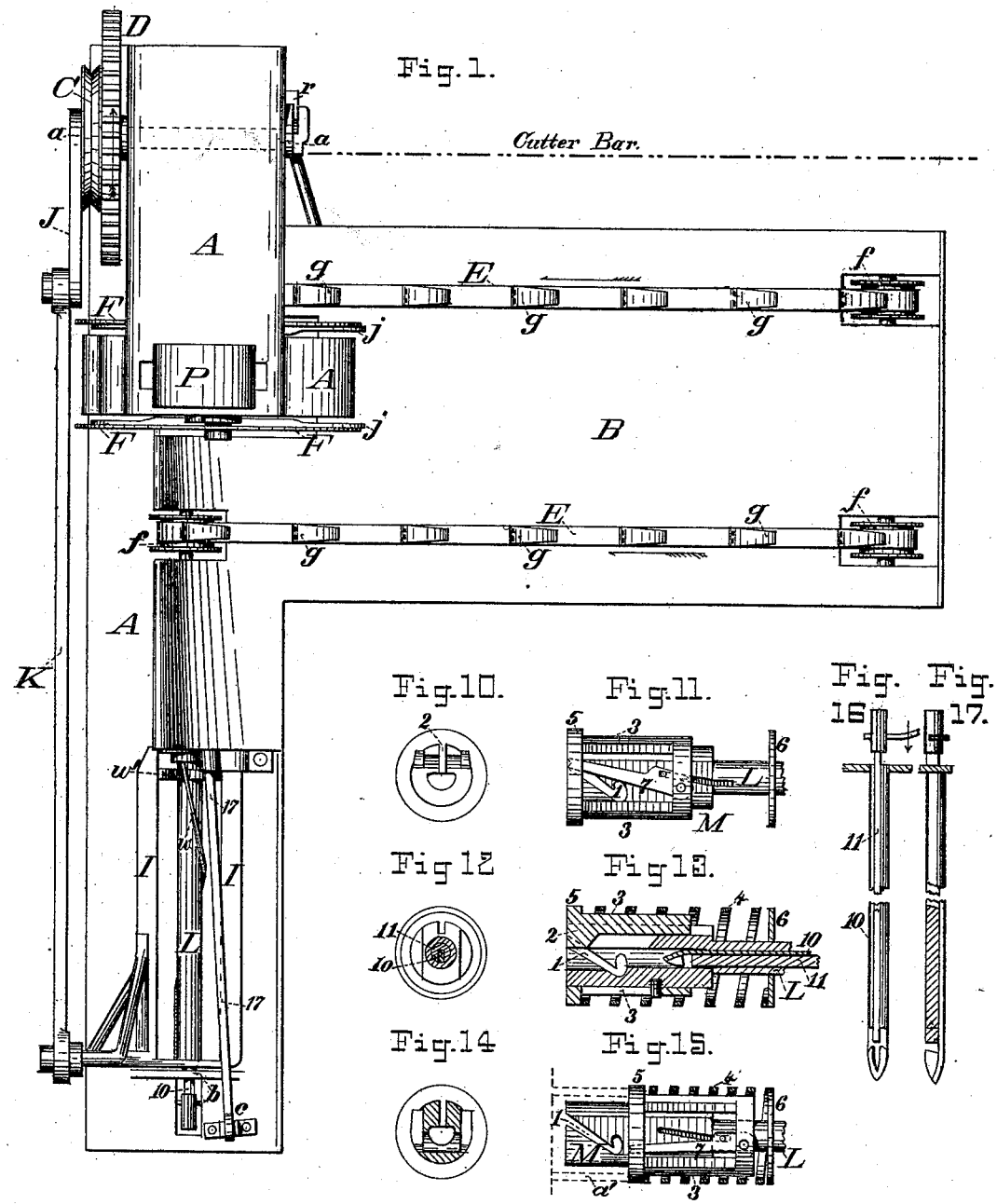
Witnesses:
Arthur C. Fraser.
George M. Thatcher
Inventor:
Robert Culbertson
Alexander Edgar
Per Burke & Fraser
Attorneys 3 Sheets—Sheet 2.
R. CULBERTSON & A. EDGAR.
GRAIN-BINDER.
No. 177,623.
Patented May 23, 1876.
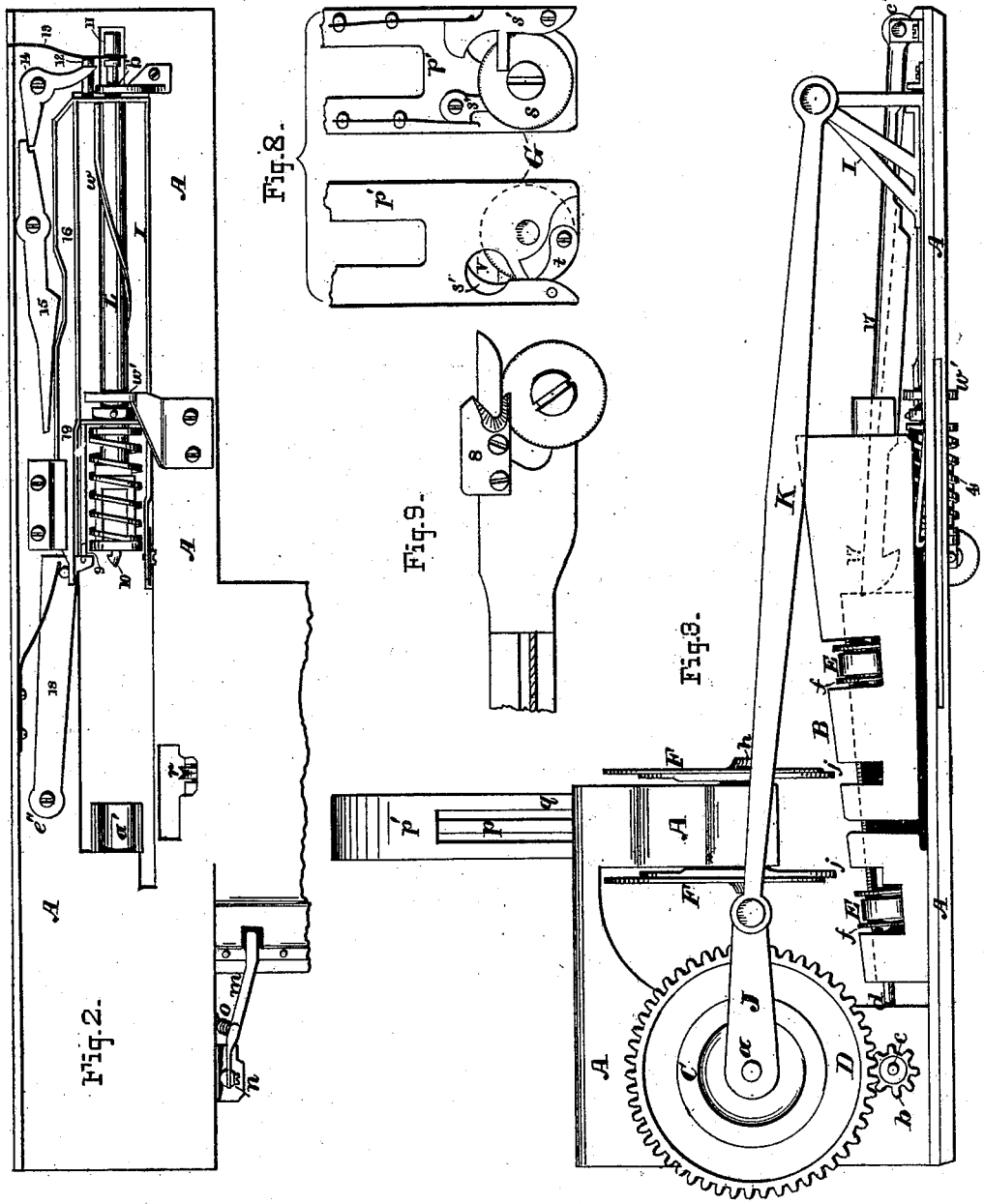
ATTEST:
Arthur C. Fraser.
George W. Thatcher
INVENTORS:
Robert Culbertson
Alexander Edgar
Per Burke & Fraser
Attys.

3 Sheets—Sheet 3.

R. CULBERTSON & A. EDGAR.
GRAIN-BINDER.

No. 177,623. Patented May 23, 1876.

ATTEST:
Arthur C. Fraser.
George W. Thatcher

INVENTORS:
Robert Culbertson
Alexander Edgar
Per Burke & Fraser, Attys

UNITED STATES PATENT OFFICE.

ROBERT CULBERTSON, OF JEFFERSON COUNTY, AND ALEXANDER EDGAR, OF VEVAY, INDIANA.

IMPROVEMENT IN GRAIN-BINDERS.

Specification forming part of Letters Patent No. 177,623, dated May 23, 1876; application filed February 25, 1876.

*To all whom it may concern:*

Be it known that we, ROBERT CULBERTSON, of Jefferson county, and ALEXANDER EDGAR, of Vevay, Switzerland county, both in the State of Indiana, have invented certain Improvements in Grain-Binders, of which the following is a specification:

The object of our invention is to receive the grain from the cutter-bar onto a platform, forward it by means of a carrier to rake-heads, rake it into a sheaf, bind it with twine or cord, and deliver it on the ground out of the way.

Figure 4:
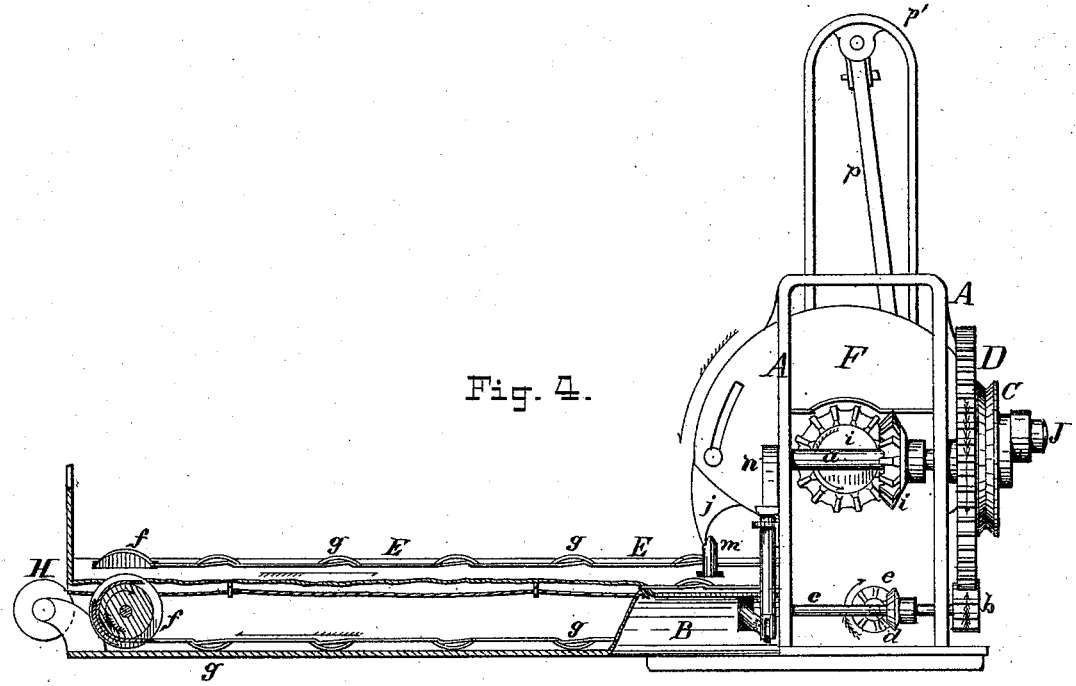
Figure 5:
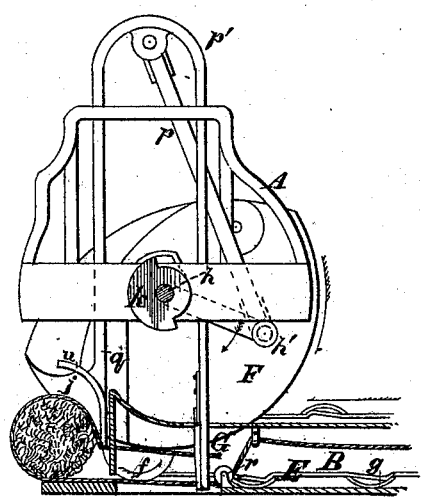
Figure 6:
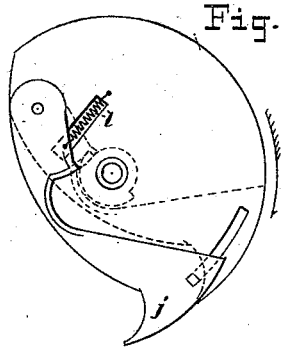
Figure 7:
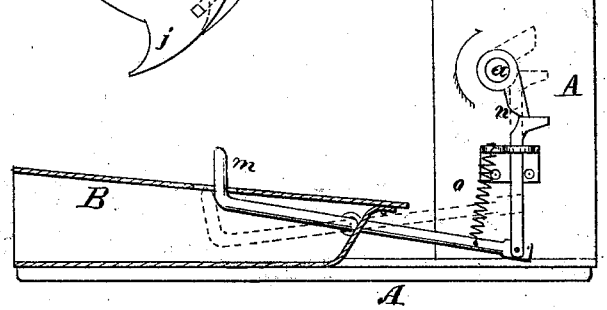

In the drawings, Figure 1 is a general plan view. Fig. 2 is a bottom view, showing the knotting mechanism. Fig. 3 is a side elevation. Fig. 4 is a front elevation, with the platform partially in section. Fig. 5 is a rear view, with one rake-head removed to show the interior mechanism. Fig. 6 is a detached view of a rake-head. Fig. 7 is a detached view, showing the mechanism for operating the tusk $m$. Fig. 8 are enlarged detached views of the cord-holder. Figs. 9 to 17, inclusive, are enlarged detail views, illustrating the cutting and knotting mechanism, which will be more fully referred to in the description.

Our attachment for binding is affixed to the harvester immediately behind the cutter-bar, the position of which is indicated by the broken line, and by name in Fig. 1, and although the cutter-bar and reel form no part of our present invention, the same frame-work may answer for the support of all. Our raking-platform is located, with respect to the cutter-bar, in substantially the same place as the raking-platform usually attached to harvesters. Let A A represent, in general, the frame-work for the support of the operative mechanism, and B the raking-platform, which has a plain upper surface, and is made double or hollow to protect the returning side of the endless grain-carrier. A sheave, C, on a shaft, $a$, derives motion from the ground-wheels of the harvester, and communicates it to the raking and binding mechanism through the medium of the various spur and miter wheels shown. The shaft $a$ bears a spur-wheel, D, which meshes with a pinion, $b$, on a shaft, $c$. This shaft communicates motion to a shaft, $d$, at right angles thereto, through miter-wheels $e$. This latter shaft bears the driving-pulley of the series of pulleys $f f$, that propel the grain-carrier E, which consists of two or more endless belts, provided with tusks or plates $g g$, attached to the belts at their front ends, and curved to correspond with the curved surface of the pulleys $f f$. The travel of the grain-carrier is continuous, and when the "run" of grain is temporarily checked during the formation of the sheaf, these curved plates permit the carrier to glide freely under the grain, and prevent the belts from carrying grain down under the platform.

The shaft $a$ communicates motion to a shaft, $h$, at right angles thereto, through the medium of miter-wheels $i$. This latter shaft bears one or more revolving rake-heads, F F, of peculiar construction, so geared that their peripheries shall travel about as fast as the grain-carrier. Each rake-head is of a gibbous form, (see Fig. 6,) about one-half the periphery being concentric with the shaft, and each is provided with a hook or tooth, $j$, arranged to be thrown out by a fixed cam, $k$, on the frame-work, and retracted by a suitable spring, $l$, on the rake-head.

Operating in connection with the rake-head, and properly timed therewith, is a tusk, $m$, which is projected up through the platform at the proper time to check the run of grain, and separate or part off the gathered sheaf, and is thrown out and retracted by means of a cam, $n$, on the shaft $a$, and a spring, $o$, as clearly shown in Fig. 7.

On the shaft $h$, between the rake-heads, as shown, is a crank, $h'$, connected by a pitman, $p$, with a vertically-reciprocating frame, $p'$, bearing a cord-holder, G, (see Fig. 8,) and a "treader," $q$.

At the outer end of the platform is hung a spool or reel, H, of binding-cord, the end of which passes forward along the under side of the platform through eyes, and then under a small sheave, $r$. Just forward of this sheave the cord is grasped by the holder G, the peculiar construction of which we will now describe with reference to the two enlarged views in Fig. 8.

A milled disk, $s$, is arranged to revolve on a pin or screw in the frame $p'$, and a grooved spring-jaw, s', embraces one edge thereof. A spring-stop, s'', acts against the periphery of the disk to prevent its turning backward. On the other side of the holder, as shown in the adjoining view, is loosely pivoted a barb or latch, t. The cord, entering sidewise, throws up the latch, which falls back under it. This effectually prevents the cord from falling out. At the same time it is firmly held and prevented from moving endwise by being grasped between the disk s and the jaw s'.

The above comprises the raking and sheaf-forming device, the operation of which we will now describe.

The grain is cut and delivered by the reel upon the platform B, whence it is forwarded by the carrier E to the rake-heads F F. The teeth $j$ $j$ of these rakes, acting in timely conjunction with the tusk $m$, strike the run of grain on the platform, make a clear separation, and carry the grain to form the sheaf under the cut-away portion of the rake-heads, to and against the bight of the binding-cord, which is now extended between the uplifted holder G and the small guide-sheave $r$.

At the moment the rake-teeth fairly engage the grain the tusk $m$ is retracted and the running grain is checked against the full circle of the rake-heads. The rake-teeth push the sheaf (now being encircled by the binding-cord) out over the edge or end of the platform, at which point they are suddenly retracted, and the smooth rounded corners of the head are presented to the sheaf, and finish the work. At this moment the treader $q$ and cord-holder G descend. The former passes down between the sheaf and the end of the platform, and compresses the double strand of binding-cord down tightly upon that portion of the frame-work upon which the sheaf now rests. A curved shield, $u$, attached to the treader, rests upon and steadies the sheaf. The cord-holder (which already grasps the end of the binding-cord) now takes hold of the cord again at another point, as shown in Fig. 5, from which it will be seen that when the device is at work the holder at all times has two strands of the cord within its grasp, the bits of cord left after tying being expelled successively through the opening $v$. (Shown in Fig. 8.) At this instant the knotter comes in play, which mechanism we will now describe.

The main frame A has an L-like extension, arranged at right angles to the platform, or nearly so, and this forms bearing-guides for a reciprocating cross-head, I, which is arranged to receive motion from the shaft $a$ through a crank, J, and pitman K. A tube, L, rests in bearings in the cross-head I, and has a spiral rib, $w$, which engages a notched cross-piece or guide, $w'$, rigidly fixed to the frame-work. This causes the tube to revolve through about three-fourths of a revolution when the cross-head moves back and forth. On the end of the tube L is an enlarged tubular piece, M, which forms the knotter proper. This piece has an oblique slot, 1, terminating in a hook or cavity, to receive the bight of the binding-cord, as shown in Figs. 11, 13, and 15. At right angles to this slot, and cut vertically, is a slot to receive a sliding bridge, 2, (see Figs. 10 and 14,) which is rigidly secured to a sliding casing, 3, which embraces the piece M, and slides thereon, being actuated by a spiral spring, 4, between a flange, 5, on the casing and a fixed collar, 6, on the tube L. Pivoted to the casing 3 on each side, and guided by slots in the piece M, are two guide-forks, 7 7, which serve to guide the cord into and out from the slot 1.

The cutting device that first severs the cord is attached rigidly to the cross-head I, and consists of a clamping device similar to that shown in the holder G, bearing a fixed outside cutter, 8, as shown enlarged in Fig. 9. At $a'$ is shown a semi-cylindrical stop, fixed rigidly to the frame-work at the point where the binding-cord crosses from the treader $q$ to the holder G.

When the sheaf has been formed, as before described, and the double cord is stretched across from the treader to the holder, the knotter advances and receives it in the oblique slot 1, the knotter being in the proper plane to insure this. At this instant, also, the flange 5 strikes the stop $a'$. The casing stops and the piece M moves on until the cord is fairly in the cavity of the slot 1. It will be observed here that the rear extremity of the rib $w$ is straight, which permits the terminal portion of the instroke of the cross-head to be made without rotating the knotter. At the same time that the cord enters the knotter a hook, 9, (see Fig. 2,) rigidly secured to the cross-head, engages it on the side next to the treader, and the device shown in Fig. 9 clamps it on the other side and cuts it from the holder G. The cord being cut, the knotter now recedes, carrying the sheaf with it, to make room for the next.

The first movement draws the piece M back into the casing 3, and the bridge 2 moves across the bight of the cord, while the forks 7 7 push it forward on each side out of the slot 1. As the knotter continues to recede it makes about three-fourths of a turn to the right, twisting the cord and forming a loop.

Attached rigidly to the outer end of the frame-work at $b'$, and resting in the hollow of the tube L, is a grooved knotting-hook, 10. (Shown enlarged, and in detail in Figs. 16 and 17.) Along the groove in this hook lies a pinch-rod, 11, which is actuated at the proper time through the medium of a pin, 12, on the cross-head, a spring, 13, a bell-crank, 14, a pivoted cam-lever, 15, and a cam, 16, on the cross-head.

The hook 10 is of such a length that when the knotter reaches the end of its outstroke the said hook has just passed through the loop and protrudes at the front, as in Fig. 2. At this moment it engages the end of the cord extending to the cutter 8, the pinch-rod 11 being pushed back by the pin 12 to enable it to do so. The knotter now advances, and a second cutter, 17, pivoted to the frame-work at $c'$, and upheld by a cam on the cross-head, is permitted to drop between the holder shown in Fig. 9 and the knotter, and sever the cords, thus permitting the hook 10 to draw the end through the loop. As the knotter continues to advance, a spring-stop, 18, pivoted to the frame at $c''$, engages the casing 3 and holds it, with the bridge 2, back long enough to permit the knot to escape from the knotter, when a cam, 19, on the cross-head lifts the said stop and allows the casing to spring back. As the hook 10 is still grasping the ends of the cord, this movement of the casing serves to draw the knot tight. Just as this movement is completed, however, the cam 16, acting through the pivoted lever 15 and bell-crank 14, draws back the pinch-rod 11, and the released sheaf falls to the ground.

Fig. 10 shows an end, and Fig. 11 a side, view of the knotter, with the spring 4 omitted. Figs. 12, 13, and 14 are sections, and Fig. 15 is a side elevation of the knotter, showing the casing pushed back and the spring compressed.

It will be understood that we do not confine ourselves to the precise arrangement of the mechanism as herein shown, as it may be varied slightly in several respects without materially affecting the operation.

We are aware that cord or twine has been used for binding grain, and that machines have been devised for tying up the grain in sheaves. Therefore we make no claim to it, broadly; but What we do claim, and desire to secure by Letters Patent, is—

1. In a grain-binder, the combination of the carrier E, constructed of endless belts, provided with plates $g\ g$, with the tusk $m$ and rake-heads F F, all arranged to operate substantially as set forth.

2. In a grain-binder, the rake-head F, provided with a spring-tooth, $j$, and a spring, $l$, in combination with a fixed cam, $k$, the whole constructed substantially as set forth, and arranged to operate in connection with the carrier E, as specified.

3. In a grain-binder, the vertically-reciprocating cord-holder G, composed of the bar $p'$, wheel $s$, spring-jaw $s'$, stop $s''$, and latch $t$, all arranged substantially as specified.

4. The combination of the cord-roller G, constructed as set forth, the treader $q$, reciprocating frame $p'$, pitman $p$, shaft $h$, and crank $h'$, all constructed and arranged to operate substantially as set forth.

5. The combination of the piece M, slotted as set forth, the tube L, spiral rib $w$, guide $w'$, casing 3, spring 4, bridge 2, flanges or collars 5 6, and forks 7 7, with the grooved hook 10 and pinch-rod 11, when constructed and arranged to operate substantially as set forth.

6. The combination of the tube L, piece M, casing 3, rib $w$, guide $w'$, spring 4, forks 7 7, hook 10, pinch-rod 11, pin 12, spring 13, bell-crank 14, cam-lever 15, cam 16, stop 18, and cam 19 with the cutters 8 and 17, stop $a'$, hook 9, and cross-head I, to form a knotting device for a grain-binder, substantially as set forth.

In witness whereof we have hereunto signed our names in the presence of two subscribing witnesses.

ROBERT CULBERTSON.
ALEXANDER EDGAR.

Witnesses:
MONTGOMERY P. BAIRD,
ADDISON WORKS.